US007398689B2

(12) United States Patent
Wijshoff

(10) Patent No.: US 7,398,689 B2
(45) Date of Patent: Jul. 15, 2008

(54) PIEZO INKJET PRINTER

(75) Inventor: Hermanus M. A. Wijshoff, Grevenbicht (NL)

(73) Assignee: Oce-Technologies B.V., Venlo (NL)

(*) Notice: Subject to any disclaimer, the term of this patent is extended or adjusted under 35 U.S.C. 154(b) by 113 days.

(21) Appl. No.: 11/374,027

(22) Filed: Mar. 14, 2006

(65) Prior Publication Data

US 2006/0207332 A1 Sep. 21, 2006

(30) Foreign Application Priority Data

Mar. 15, 2005 (NL) .................................... 1028546

(51) Int. Cl.
*G01L 11/00* (2006.01)

(52) U.S. Cl. .......................................... 73/702; 347/54

(58) Field of Classification Search ................... 73/702; 347/9, 54, 11, 92
See application file for complete search history.

(56) References Cited

U.S. PATENT DOCUMENTS

| | | | | |
|---|---|---|---|---|
| 4,528,578 | A * | 7/1985 | Balbo | 347/94 |
| 4,528,579 | A * | 7/1985 | Brescia | 347/94 |
| 4,672,398 | A | 6/1987 | Kuwabara et al. | |
| 4,688,048 | A | 8/1987 | Uematsu et al. | |
| 6,926,388 | B2 * | 8/2005 | Groninger et al. | 347/54 |
| 2004/0125158 | A1 * | 7/2004 | Groninger et al. | 347/9 |
| 2006/0170725 | A1 * | 8/2006 | Reinten et al. | 347/19 |
| 2006/0170744 | A1 * | 8/2006 | Boesten et al. | 347/92 |
| 2006/0176339 | A1 * | 8/2006 | Groot Wassink | 347/54 |

FOREIGN PATENT DOCUMENTS

| | | | |
|---|---|---|---|
| DE | 43 28 433 | A1 | 3/1995 |
| EP | 1 378 357 | A | 1/2004 |
| JP | 60-11369 | A | 1/1985 |
| JP | 3-216338 | A | 12/1991 |
| JP | 9-109385 | A | 4/1997 |
| JP | 11-291496 | A | 1/2000 |

* cited by examiner

*Primary Examiner*—Andre J Allen
(74) *Attorney, Agent, or Firm*—Birch, Stewart, Kolasch & Birch, LLP

(57) ABSTRACT

An inkjet printer containing a substantially closed ink duct and a transducer used to generate a pressure wave in the duct, wherein the transducer comprises a first part and, separate from the first part, a second part whereby, by actuation of the transducer, the first part manifests a first deformation and the second part simultaneously manifests a second deformation actually opposed to the first deformation, such that a pressure wave is generated in the ink duct.

5 Claims, 5 Drawing Sheets

PIEZO INKJET PRINTER

This application claims priority to Dutch Patent Application No. 1028546 filed on Mar. 15, 2005 in The Netherlands, the entire contents of which is hereby incorporated by reference in its entirety.

BACKGROUND OF THE INVENTION

The present invention relates to an inkjet printer containing a substantially closed ink duct and a transducer that is substantially parallel to the closed duct, this transducer deforming by actuation in order to generate a pressure wave in the duct.

An inkjet printer of this kind is known from U.S. Pat. No. 4,688,048. As is known from the prior art, actuation of a transducer of the above kind causes it to deform, so that a sudden volume change occurs in the duct (also referred to as "ink chamber"). This produces a pressure wave in the duct. If the pressure wave is strong enough, this leads to a drop of ink being ejected from the duct nozzle. In this manner, each individual actuation may lead to a drop of ink being ejected. By imposing such actuations image-wise, an image, built up of individual ink drops, can be formed on a receiving medium. It is known from said patent, that the generated pressure wave comprises first, second, third, fourth and higher order harmonics. Depending on the size of the transducer and position relative to the duct, generally one of said harmonics is handled. A typical drop size is associated with each harmonic, where the size decreases in line with a higher order harmonic generally being handled. In order to handle, for example, a third order harmonic (see FIG. 3 of said U.S. patent) it may be opted to use a transducer the length of which is equal to one third of the duct length, this transducer coinciding with the antinode of this harmonic. In order to handle a higher order harmonic, it may also be opted to use two or more separate transducers (see FIG. 6 of said U.S. patent), the position of which coincides with antinodes of this higher order harmonic. This known method is suitable for handling higher order vibrations very selectively and, as a result, to generate drops with a very small volume, without this requiring for the size of the exit opening to be reduced and/or the drop speed to be modified.

However, the known printer does have major disadvantages. If it is opted to apply one transducer, the position of which coincides exactly with the antinode of a higher order harmonic, then this transducer will at all times only be able to extend along the limited length of the duct. The higher the order of the desired harmonic, the shorter the length of the transducer will be. In order to achieve a strong enough volume change in the duct using such a small transducer, a relatively high actuation voltage will be required. High voltages reduce the lifespan of the transducer and therefore that of the printhead. Furthermore, it will be virtually impossible for fourth or higher order vibrations to obtain large enough volume changes using one transducer. In these cases, it will therefore be necessary to opt for the application of two or more individually actuatable transducers. The disadvantage of this approach is that it leads at least to duplication of the actuation electronics of the printheads. Furthermore, the application of two or more individually actuatable transducers will make the production of the printheads much more complex. Therefore, the application of two or more individual transducers per ink duct, although repeatedly referred to in the patent literature (see for example DE 43 28 433, JP 60 011369, U.S. Pat. No. 4,672,398) is not financially attractive.

SUMMARY OF THE INVENTION

The objective of the present invention is to obviate the above problems. To this end, an inkjet printer has been invented wherein the transducer comprises in a direction parallel to the duct, a first part and, separate from this, a second part, whereby, by actuation of which transducer, the first part manifests a first deformation and the second part a second deformation essentially opposed thereto, such that a pressure wave is generated in the ink duct.

In this printer, the transducer comprises two separate parts, both of which deform as a result of one actuation, where the one part, for example, deforms in one direction and the second part simultaneously deforms in the opposite direction. If both parts coincide with the antinodes of a second or higher order harmonic, this will therefore preferably be handled. The advantage of the present invention is that it may suffice to use actuation electronics equal to the actuation of one single transducer, but which may still allow for a relatively large part of the duct length to be used in order to generate the pressure wave. Thus, a relatively low actuation voltage may suffice. It should be understood that it may be opted for a third or higher order harmonic for a transducer which comprises three or more separate parts, respectively.

According to one embodiment where the transducer comprises polarized piezo-electric material, the polarization direction of the first part is essentially opposed to the polarization direction of the second part. According to this embodiment, a deformation of both parts in opposing directions is very easily arranged. By arranging an opposing polarization direction for both parts, actuation of the transducer will automatically deform the first part in a direction opposite to the second part. An additional advantage of this embodiment is that for a common type of piezo-electric transducer, i.e., the type where various layers of piezo-electric material are separated from each other by electrodes, the largest part of the process of producing a transducer of this kind (consolidating the layer assembly, sintering the layers, cutting the individual piezo transducers, etc.) is identical to producing the known transducers.

According to an alternative embodiment where the transducer is made up of a number of layers of piezo-electric material which are separated from each other by electrodes, the electrodes in the first part are polarized differently compared to the electrodes in the second part. According to this embodiment, the first part is also actuated with one and the same actuation pulse as the second part, but because the electrodes are polarized differently, it seems as if the first part is actuated with an opposing voltage compared to the second part. According to this embodiment, the location of the ultimate transducer must be taken into account when producing the electrodes. The other process steps used to produce the transducer may remain the same as the steps known from the prior art.

According to another embodiment, the inkjet printer has been modified to print using a type of ink which is solid at room temperature and liquid at elevated temperature. Practice has shown that it may be advantageous to use the present invention particularly with inkjet printers which make use of this so-called hot melt ink. With liquid inks, for example, water-based or using organic solvents, small drops may be easily obtained by modifying the actuation pulse of a standard transducer (for example an electro-thermal or electro-mechanical transducer). With hot melt ink or other inks with a relatively high viscosity, this appears to be more difficult, which may likely have to do with the much higher viscosity of these inks. Practice has shown that by application of a transducer according to the present invention, small drops may be easily obtained if hot melt ink is used.

BRIEF DESCRIPTION OF THE DRAWINGS

The present invention will now be further explained with reference to the following examples.

DETAILED DESCRIPTION OF THE INVENTION

Figure 1:
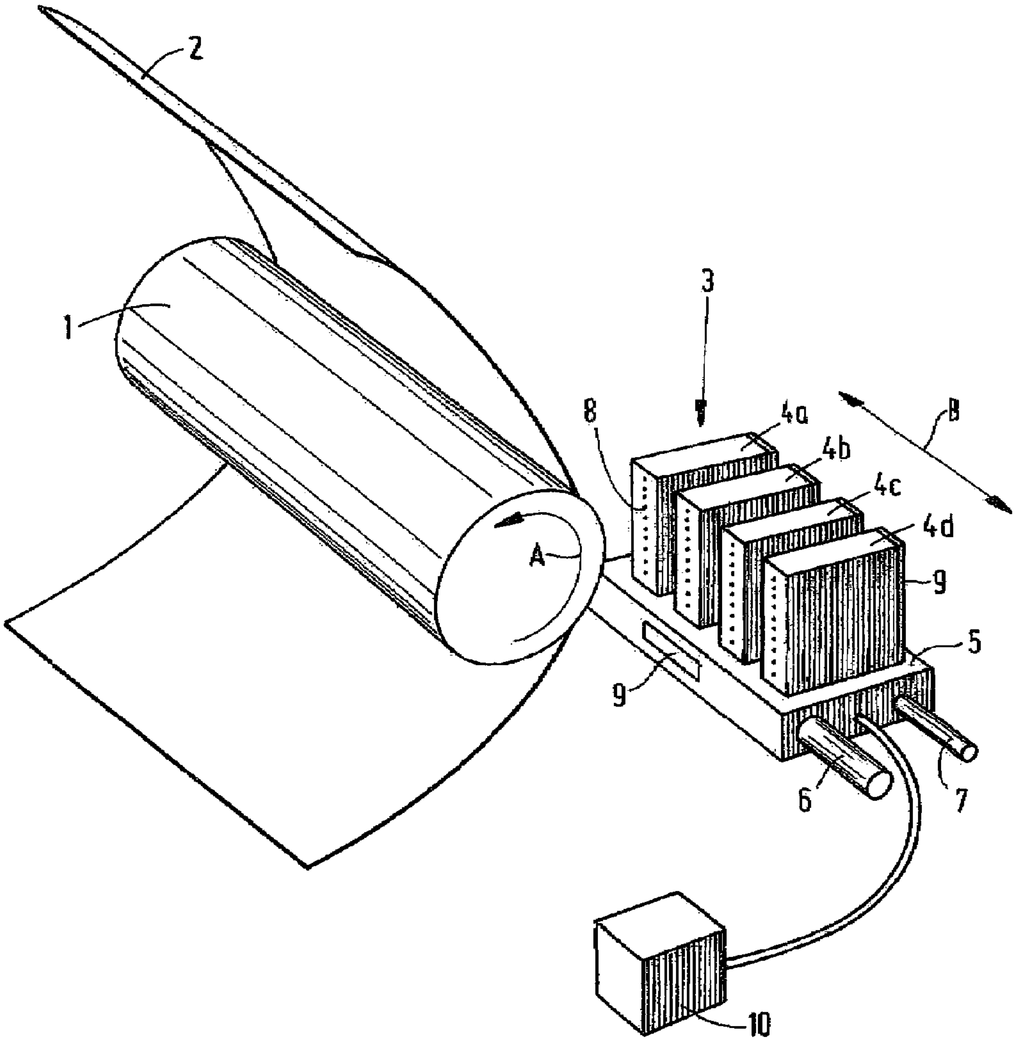
FIG. 1 is a diagram showing an inkjet printer.

FIG. 1 is a diagram showing an inkjet printer. According to this embodiment, the printer comprises a roller 1 used to support a receiving medium 2, such as a sheet of paper or a transparency, and move it across a carriage 3. The carriage comprises a carrier 5 to which four printheads 4*a*, 4*b*, 4*c* and 4*d* have been fitted. Each printhead contains its own color, in this case cyan (C), magenta (M), yellow (Y) and black (K), respectively. The printheads are heated using heating elements 9, which have been fitted to the rear of each printhead 4 and to the carrier 5. The temperature of the printheads is maintained at the correct level by the application of a central control unit 10 (controller).

The roller 1 rotates around its own axis as indicated by arrow A. In this manner, the receiving medium may be moved in the sub-scanning direction (often referred to as the X direction) relative to the carrier 5, and therefore also relative to the printheads 4. The carriage 3 may be moved in reciprocation using suitable drive mechanisms (not shown) in a direction indicated by double arrow B, parallel to roller 1. To this end, the carrier 5 is moved across the guide rods 6 and 7. This direction is generally referred to as the main scanning direction or Y direction. In this manner, the receiving medium may be fully scanned by the printheads 4.

According to the embodiment as shown in FIG. 1, each printhead 4 comprises a number of internal ink ducts (not shown), each with its own exit opening (nozzle) 8. The nozzles in this embodiment form one row per printhead perpendicular to the axis of roller 1 (i.e., the row extends in the sub-scanning direction). In a practical embodiment of an inkjet printer, the number of ink ducts per printhead will be many times greater and the nozzles will be arranged over two or more rows. Each ink duct includes a piezo-electric transducer (not shown) that may generate a pressure wave in the ink duct so that an ink drop can be ejected from the nozzle of the associated duct in the direction of the receiving medium. The transducers may be actuated image-wise via an associated electrical drive circuit (not shown) by application of the central control unit 10. In this manner, an image built up of ink drops may be formed on receiving medium 2.

If a receiving medium is printed using such a printer where ink drops are ejected from ink ducts, this receiving medium, or a part thereof, is imaginarily split into fixed locations that form a regular field of pixel rows and pixel columns. According to one embodiment, the pixel rows are perpendicular to the pixel columns. The individual locations thus produced may each be provided with one or more ink drops. The number of locations per unit of length in the directions parallel to the pixel rows and pixel columns is referred to as the resolution of the printed image, for example indicated as 400×600 d.p.i. ("dots per inch"). By actuating a row of printhead nozzles of the inkjet printer image-wise when it is moved relative to the receiving medium as the carrier 5 moves, an image, or part thereof, built up of ink drops is formed on the receiving medium, or at least in a strip as wide as the length of the nozzle row.

Figure 2A:
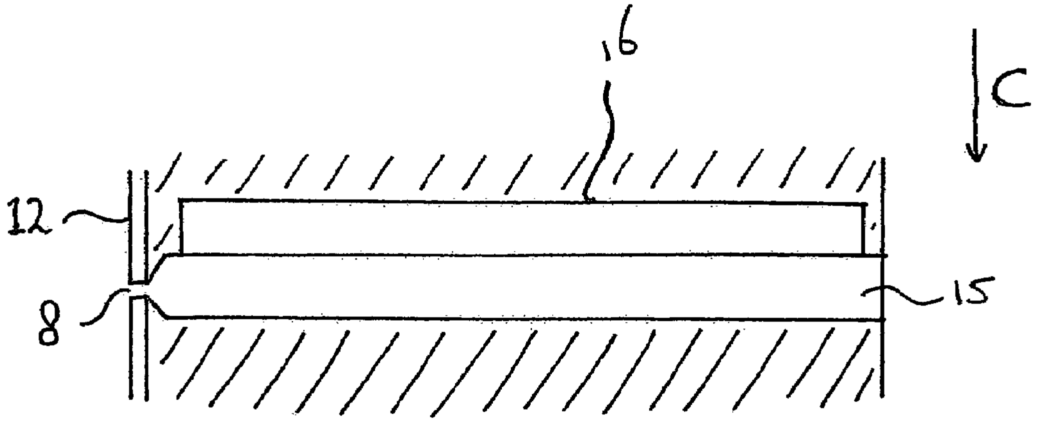
FIG. 2A and FIG. 2B show a transducer and a duct as known from the prior art, and the pressure waves generated in this duct.
Figure 2B:
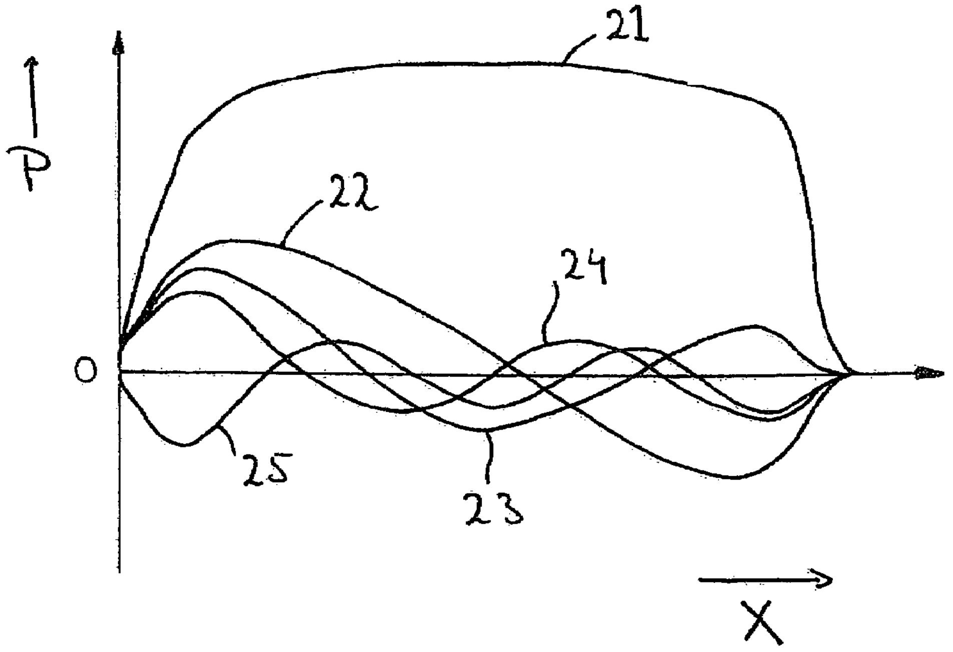

FIG. 2A is a diagram showing an ink duct 15 that ends in an exit opening 8 which is fitted in a nozzle plate 12. The ink duct is limited at one side by a piezo-electrical transducer 16 which may be electrically actuated (actuation means not shown). The transducer is polarized in the direction indicated by C. By imposing actuation in the form of a pulse where the potential across the transducer increases in the same direction as the polarization direction indicated, transducer 16 will suddenly expand. This causes the volume of the duct to suddenly decrease, which generates a pressure wave in the duct. If this pressure wave is strong enough, a drop of ink will be ejected from exit opening 8. After actuation, the transducer will bend back (shrink) to its initial state causing the duct volume to increase. This causes an underpressure in the duct and new ink is supplied via an inlet opening of the duct (not shown). FIG. 2B is a diagram showing the sort of vibrations that are generated in the duct by actuation of the piezo-electric transducer. The diagram shows pressure P (vertical axis) relative to location X (horizontal axis) in the duct. The vibrations generated are harmonic vibrations which, according to this embodiment, do not produce pressure changes (P=0) at nozzle 8 and at the other end of the duct. Generally, a first order harmonic 21 is generated which leads to a maximum pressure change in the middle of the duct. As a side effect, second (22), third (23), fourth (24), fifth (25) and higher (not shown) order vibrations are also produced. These higher order vibrations, however, only make up a small part of the total pressure wave, as the transducer preferably handles the first order harmonic, this transducer extending across the length of the duct.

Figure 3A:
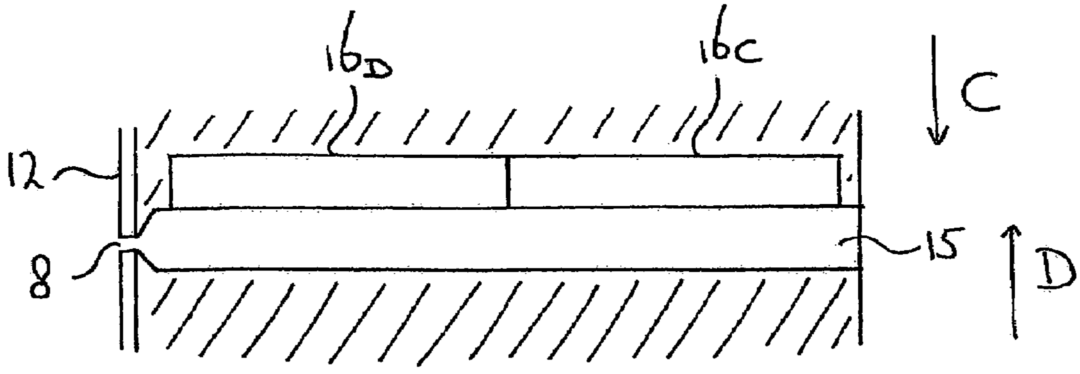
FIG. 3A and FIG. 3B show a transducer and a duct according to the present invention, and the pressure waves generated in this duct.

FIG. 3A is a diagram showing the same ink duct 15 as shown in FIG. 2A. However, the ink duct is now limited on one side by a piezo-electrical transducer which is made up of separate parts 16$_C$ and 16$_D$. These parts form one transducer together, which may be actuated by application of one pulse, though the polarizations of the two parts are opposed. Part 16$_C$ is polarized in the direction indicated by C whereas part 16$_D$ is polarised in the direction indicated by D. If an actuation in the form of a pulse is imposed on this transducer, where the potential across the transducer increases in the direction indicated by D, then part 16$_C$ will suddenly shrink and part 16$_D$ will suddenly expand. This causes a pressure wave to be generated in ink duct 15.

Figure 3B:
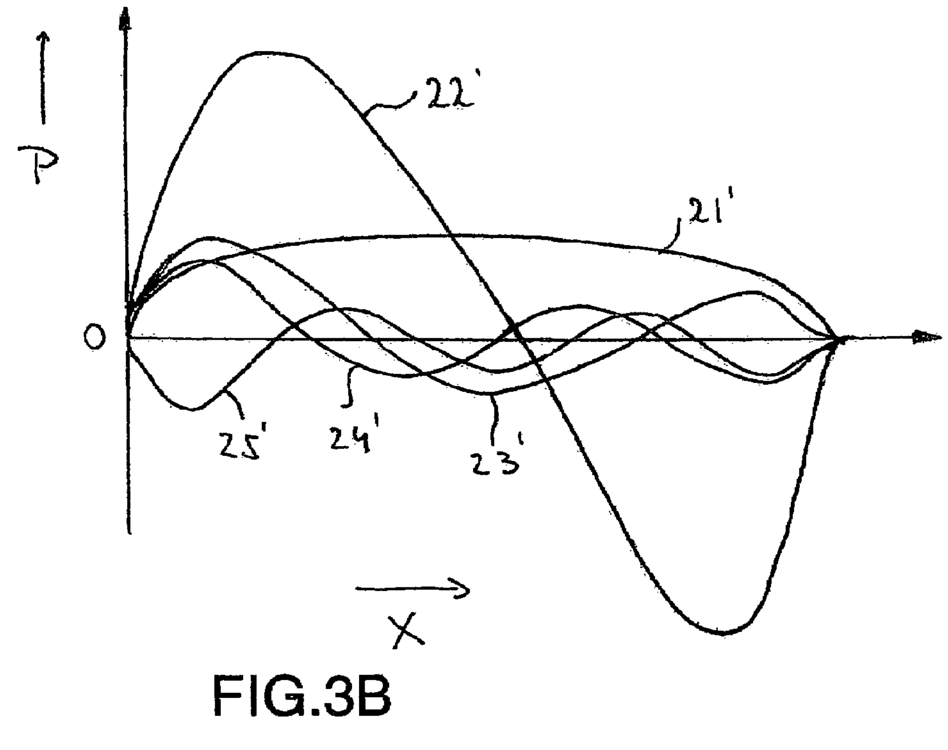

As indicated in FIG. 3B, the pressure wave in this configuration will, however, generally comprise a second order harmonic (22'). The presence of first (21') order vibrations and higher order (23', 24', 25', etc.) vibrations will be a lot less dominant. If the pressure wave is strong enough, an ink drop will be ejected from nozzle 8. However, it will be smaller than the drop that is ejected when actuation takes place as described beneath FIG. 2. This makes it possible to print qualitatively good images with a fine resolution and furthermore, to save on the amount of ink required to print an image.

Figure 4:
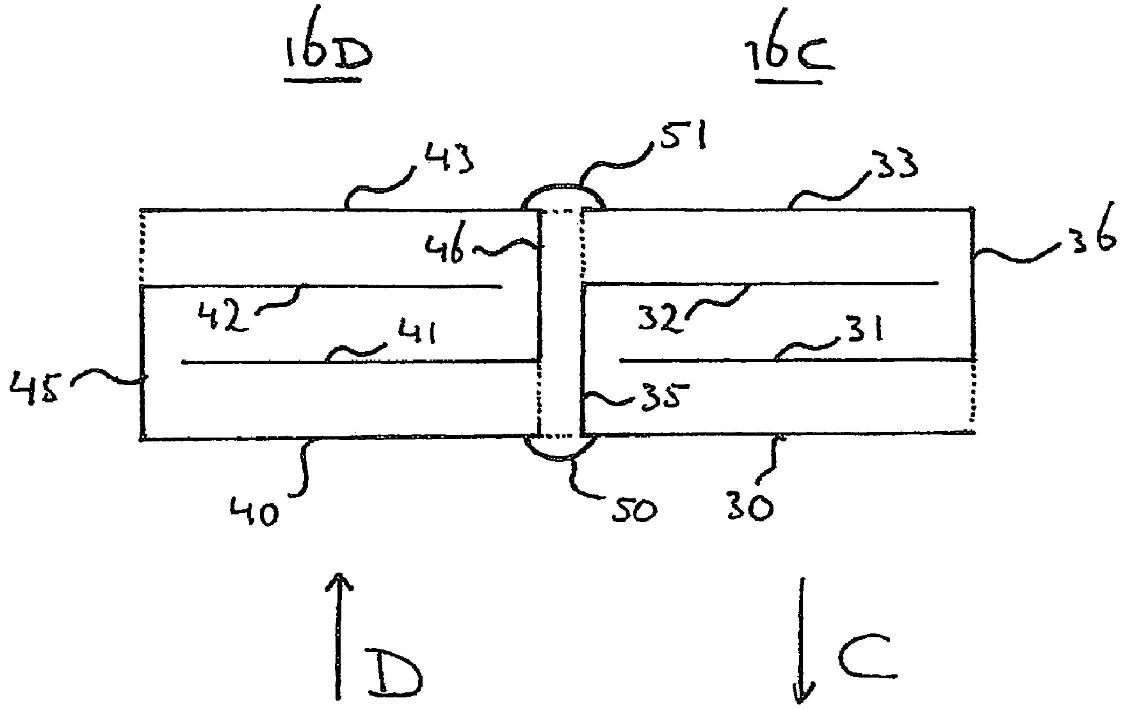
FIG. 4 is a diagram showing the transducer of FIG. 3 in greater detail.

FIG. 4 is a diagram again showing transducer 16 of FIG. 3, but with more detail. Each of the parts 16$_C$ and 16$_D$ comprises a three-layer piezo-electric element. Part 16$_C$ comprises electrodes 30, 31, 32 and 33 between which are provided layers of piezo-electric material. Electrodes 30 and 32 are connected to each other via conductor 35. Electrodes 31 and 33 are connected to each other via conductor 36. The piezo-electric material that is located between the electrodes is polarized in the direction indicated by C. Part $\mathbf{16}_D$ comprises electrodes 40, 41, 42 and 43 between which there are also layers of piezo-electric material. Electrodes 40 and 42 are connected to each other via conductor 45. Electrodes 41 and 43 are connected to each other via conductor 46. The piezo-electric material that is located between the electrodes is polarized in the direction indicated by D. In this example, parts $\mathbf{16}_C$ and $\mathbf{16}_D$ are separate piezo-electric elements which have been produced independently from each other and have been united into one transducer by being electrically connected. To this end, connections 50 and 51 have been fitted. The parts themselves may be separated by a small gap as indicated in the example, but could also be mechanically connected via an electrically insulating glue or by any other method whatsoever.

Figure 5A:
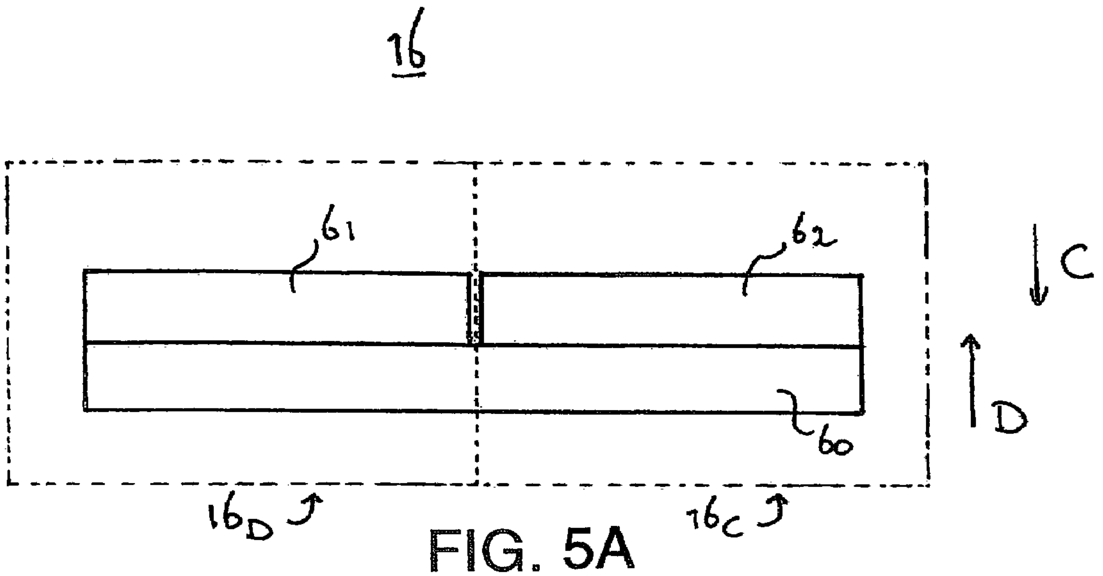
FIG. 5 is a diagram showing an alternative transducer according to the invention.
Figure 5B:
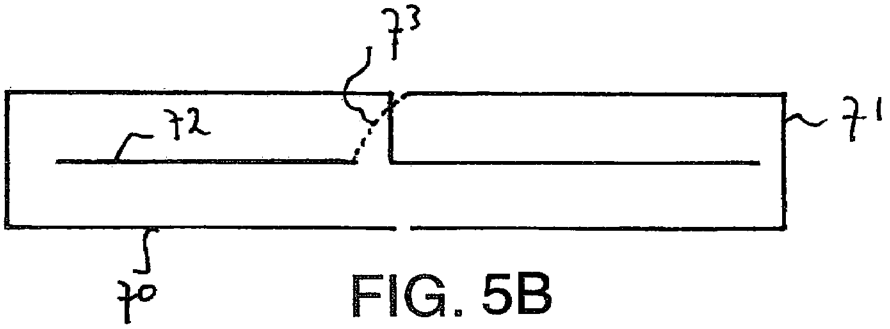

FIG. 5 is a diagram showing an alternative transducer 16 according to the present invention. This transducer is also comprises two separate parts $\mathbf{16}_C$ and $\mathbf{16}_D$. FIG. 5A is a diagram showing the piezo-electric layers which make up this transducer. There is a first layer, indicated by element 60, this layer continuing without interruption from part $\mathbf{16}_C$ to part $\mathbf{16}_D$. This layer is polarized in the direction indicated by D. The second layer comprises elements 61 (for part $\mathbf{16}_D$) and 62 (for part $\mathbf{16}_C$). These parts are both polarized in the direction indicated by C. Parts 61 and 62 are fitted as loose elements onto layer 60 as the electrode structure is not the same for parts $\mathbf{16}_C$ and $\mathbf{16}_D$. FIG. 5B is a diagram showing this electrode structure. This structure comprises a first electrode 70 which is limited at the bottom of layer 60, at least where it is part of transducer part $\mathbf{16}_D$. Electrode 70 then surrounds this part $\mathbf{16}_D$ and ends between parts 60 and 62 in part $\mathbf{16}_C$. There is a second electrode which comprises electrode parts 71 en 72. Part 71 largely surrounds part $\mathbf{16}_C$. Electrode part 72 has been fitted between parts 60 and 61 at the level of transducer part $\mathbf{16}_D$ (to this end, first electrode 72 may be fitted onto part 60, for example, before part 61 is fitted to part 60). Electrode parts 71 and 72 are electrically connected to each other, indicated by dotted line 73, in this case via the invisible rear of transducer 16.

If electrode 70 receives a positive potential relative to electrode 71/72 with this transducer 16, then part $\mathbf{16}_C$ will expand and $\mathbf{16}_D$ shrink. In this manner, preferably a second order harmonic may be handled if one single actuation pulse is applied across transducer 16.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An inkjet printer containing a substantially closed ink duct and a transducer that is disposed substantially parallel to the ink duct, said transducer being deformed by actuation in order to generate a pressure wave in the duct, wherein the transducer comprises in a direction parallel to the duct, a first part and, separate from this, a second part, whereby, by actuation of the transducer, the first part manifests a first deformation and the second part simultaneously manifests a second deformation essentially opposed to the first deformation, such that a pressure wave is generated in the ink duct.

2. The inkjet printer according to claim 1, where the transducer comprises polarized piezo-electric material, wherein the polarization direction of the first part is essentially opposed to the polarization direction of the second part.

3. The inkjet printer according to claim 1, where the transducer is built up of a number of layers of piezo-electric material which are separated from each other by electrodes, the electrodes in the first part being polarized differently compared to the electrodes in the second part.

4. The inkjet printer according to claim 1, wherein the inkjet printer has been modified to print using a type of ink which is solid at room temperature and liquid at elevated temperature.

5. A transducer for an inkjet printer which comprises a first part polarized piezo-electric material and a separate part of piezo-electric material having a polarization opposed to the first part, whereby the first part manifests a first deformation and the second part, simultaneously manifests a second deformation essentially opposite to the first deformation, such that a pressure valve is generated in an ink duct of the printer.

* * * * *